United States Patent
Tims et al.

(10) Patent No.: US 7,637,684 B2
(45) Date of Patent: Dec. 29, 2009

(54) BOOM POLE

(75) Inventors: Philip Tims, Gloucestershire (GB); Timothy George Henson, West Midlands (GB)

(73) Assignee: Rycote Microphone Windshields Ltd., Gloucestershire (GB)

( * ) Notice: Subject to any disclaimer, the term of this patent is extended or adjusted under 35 U.S.C. 154(b) by 0 days.

(21) Appl. No.: 12/161,939

(22) PCT Filed: Jan. 27, 2007

(86) PCT No.: PCT/GB2007/000180

§ 371 (c)(1), (2), (4) Date: Jul. 23, 2008

(87) PCT Pub. No.: WO2007/085802

PCT Pub. Date: Aug. 2, 2007

(65) Prior Publication Data

US 2009/0008213 A1 Jan. 8, 2009

(30) Foreign Application Priority Data

Jan. 25, 2006 (GB) ................................ 0601441.9

(51) Int. Cl.
*F16B 7/10* (2006.01)
(52) U.S. Cl. .................... 403/109.5; 403/290
(58) Field of Classification Search ............. 403/109.5, 403/290; 248/159; 381/363
See application file for complete search history.

(56) References Cited

U.S. PATENT DOCUMENTS

| | | | |
|---|---|---|---|
| 3,515,418 A * | 6/1970 | Nielsen, Jr. ............... | 403/109.5 |
| 4,154,545 A | 5/1979 | Pinto et al. | |
| 4,238,164 A | 12/1980 | Mazzolla | |
| 5,193,476 A * | 3/1993 | Namur ........................ | 114/98 |
| 5,649,780 A * | 7/1997 | Schall ...................... | 403/109.5 |
| 6,142,698 A | 11/2000 | Nutter | |
| 6,520,192 B1 | 2/2003 | Lo | |
| 6,761,501 B1 * | 7/2004 | Nakatani ................. | 403/109.5 |

FOREIGN PATENT DOCUMENTS

| | | |
|---|---|---|
| DE | 3807028 C1 | 9/1989 |
| EP | 0021795 A1 | 1/1981 |
| EP | 0299491 A1 | 1/1989 |
| FR | 2600198 A1 | 12/1987 |
| FR | 2764950 A1 | 12/1998 |
| WO | 03024545 A1 | 3/2003 |

OTHER PUBLICATIONS

International Search Report of PCT/GB2007/000180.
Search Report of Application No. GB0601441.9.

* cited by examiner

*Primary Examiner*—Victor Macarthur
(74) *Attorney, Agent, or Firm*—Sutherland Asbill & Brennan LLP

(57) ABSTRACT

The present invention relates to a locking means (1) for use in releasably locking a first tubular structure (100) of a first diameter and a second tubular structure (101) of a second diameter in a predetermined position telescopically in relation to each other. The second diameter is less than the first diameter and the locking means comprises a component (2) adapted for gripping at least the second tubular structure and a component (5) adapted in use to cause the locking means to have a locked position in which the second tubular structure is held in place relative to the first tubular structure and an open position in which the second tubular structure is telescopically movable relative to the first tubular structure.

9 Claims, 3 Drawing Sheets

BOOM POLE

The present invention relates to boom poles, particularly for use with microphones. The invention is primarily concerned with telescopic boom poles.

Boom poles are used to allow a sound person to position a microphone, which is mounted on the boom pole, close to a sound source whilst allowing the sound person to be far enough from the sound source to avoid being seen on any camera recording the activities of the sound source.

The boom pole should be able to extend over a variety of distances, for example up to 2.5 m. The pole must therefore be collapsible, for example telescopic, to allow easy transportation between uses. Telescopic boom poles comprise at least two tubular structures, one of a diameter larger than the other such that they are sized to fit one inside the other in a telescoping arrangement. The means to join the telescoping structures and lock them in position for use must be strong and must hold the two tubular structures firmly in relation to each other. Furthermore the joining means must be suitably robust to withstand frequent use.

It is known to construct telescopic boom poles from aluminium or carbon fibre and in these known poles the tubular structures are aluminium or carbon fibre and the joining means between the tubular structures are usually aluminium. The joining means generally comprise a screw-threaded collar and collet arrangement associated with the tubular structure of larger diameter, which is provided with a screw threaded portion corresponding to the collar. The tightening of the screw-threaded collar onto the tubular structure of larger diameter causes the collet to grip the tube of smaller diameter.

There is however a problem with the use of aluminium to form the tubular structures in that it is not a particularly strong metal and boom poles made of aluminium are easily damaged and rendered useless. Carbon fibre is a stronger material but cannot be provided with an integral screw threaded portion and therefore requires the use of a separate joining means between the tubular structures. The currently available joining means are bonded to the tubular structures by an appropriate bonding agent, giving rise to a complex manufacturing process involving a number of steps and in which a number of parts must be manufactured and bonded together.

Accordingly there remains a need for a boom pole, particularly a carbon fibre boom pole, having a joining means that is simple and quick to assemble together with one or more tubular structures and does not require use of a bonding agent. It is also desirable that the joining means should secure one tubular structure strongly within another and should not loose strength over time.

Whilst this invention is described primarily in relation to boom poles it will be understood that it is applicable to telescopic poles used in other areas.

Accordingly the present invention provides a locking means for use in releasably locking a first tubular structure of a first diameter and a second tubular structure of a second diameter in a predetermined position telescopically in relation to each other, the second diameter is less than the first diameter and the locking means comprises a component adapted for gripping at least the second tubular structure and a component adapted in use to cause the locking means to have a locked position in which the second tubular structure is held in place relative to the first tubular structure and an open position in which the second tubular structure is telescopically movable relative to the first tubular structure, wherein the gripping component comprises a first part sized and adapted in use to receive the first tubular structure and a second part extending from the first part and sized and adapted in use to receive the second tubular structure wherein the second part comprises two or more resilient fingers, and the locking component extends around at least part of the gripping component and comprises means adapted in use to bring the resilient fingers into contact with the second tubular structure in the locked position.

The present invention further provides a combination of:

a first tubular structure of a first diameter, a second tubular structure of a second diameter where the second diameter is less than the first diameter, and a locking means for use in releasably locking the first tubular structure and the second tubular structure in a predetermined position telescopically in relation to each other;

the locking means comprises a component adapted for gripping at least the second tubular structure and a component adapted in use to cause the locking means to have a locked position in which the second tubular structure is held in place relative to the first tubular structure and an open position in which the second tubular structure is telescopically movable relative to the first tubular structure, wherein the gripping component comprises a first part sized and adapted in use to receive the first tubular structure and a second part extending from the first part and sized and adapted in use to receive the second tubular structure wherein the second part comprises two or more resilient fingers, and the locking component extends around at least part of the gripping component and comprises means to bring the resilient fingers into contact with the second tubular structure in the locked position.

The first part of the gripping component is preferably cylindrical in shape. The first part of the gripping component preferably has a first end portion that is open to receive the first tubular structure.

The first part of the gripping component preferably has an internal surface sized to fit around an external surface of the first tubular structure when in use. The first part of the gripping component is preferably adapted in use to fit around one end portion of the first tubular structure.

The second part of the gripping component preferably comprises two or more resilient fingers that extend away from the first part of the gripping component from the end of the first part distal from the first end portion. The fingers each preferably extend in a direction substantially parallel to a longitudinal axis running through the first part of the gripping component.

There may be provided two, three, four or more resilient fingers, it is preferred that there are three resilient fingers. The resilient fingers are preferably spaced apart from each other; most preferably they are spaced equidistant from each other.

One or more of the resilient fingers may be provided with a raised area on an external surface thereof. The raised area is preferably a cam surface.

The gripping component is preferably a hollow structure. The gripping component may be provided with lugs extending from an inner surface, most preferably of the first part, adapted in use to locate in indentations provided in the first tubular structure.

The locking component preferably comprises a collar that extends around the gripping component and contacts at least part of an outer surface of the gripping component.

The collar is preferably rotatable relative to the longitudinal axis of the gripping component. The collar is preferably secured to the gripping component such that it is rotatable relative to the longitudinal axis of the gripping component.

The collar preferably has a first end and a second end. The collar is preferably provided with a first set of one or more cam surfaces positioned on an inner surface such that one or more of the cam surfaces contacts at least one of the two or more resilient fingers when the collar is in the locked position. Preferably the or each cam surface contacts a raised area, or cam surface, provided on the resilient finger.

Preferably there is provided one cam surface positioned in use to act on each resilient finger. The first set of one or more cam surfaces is preferably positioned close to the first end of the collar.

In a preferred embodiment the first part of the gripping portion is provided with one, two or more cut away portions extending parallel to the longitudinal axis of the gripping component. Therefore the first part is provided with two or more resilient arms separated by the cut away portions. The arms are preferably each provided with raised areas positioned on an external surface thereof. The raised areas are preferably cam surfaces.

In this preferred embodiment the collar of the locking component is provided with a second set of one or more cam surfaces positioned on its inner surface such that one or more of the cam surfaces contacts at least one of the two or more resilient arms when the collar is in the locked position. The second set of cam surfaces is preferably provided close to the second end of the collar. The second set of cam surfaces preferably engages the raised areas, or cam surfaces, of the arms when the collar is in the locked position. Preferably there is provided one cam surface positioned in use to act on each resilient arm.

The collar is preferably also provided with one, two or more cut away portions preferably extending parallel to the longitudinal axis of the collar. The cut away portions are preferably provided on the second end of the collar. The cut away portions allow the second part of the collar to move out of contact with the raised areas of the arms of the first portion when it is rotated into the unlocked position. The cut away portions also ensure that there is direct action between the first set of one or more cam surfaces and the resilient fingers. The presence of the cut away portions also means that the action between the second set of one or more cam surfaces and the resilient arms is a secondary action and relies on the spring effect of the collar.

Preferably the tubular structures are made from carbon fibre. The gripping component and the locking component of the locking means are preferably made from a suitable mouldable material, such as a mouldable plastics material, for example acetal.

The locking means of the present invention is advantageous in many ways. It is simple in its design and the components are easy to manufacture by standard moulding techniques, such as injection moulding. The locking means can be manufactured from standard mouldable plastics materials.

The locking means is robust and easy and quick to use. It is only necessary to rotate the locking component through a small number of degrees to move from the open to locked position and back again compared to standard collar and collet locking means which must be rotated through several complete turns to lock and open.

The locking means can be manufactured in any suitable size depending on the size of the tubular structures with which it is to be used.

The gripping component does not require any bonding agent to secure it to the first tubular structure but is held in place by the first part locating on an end portion of the tubular member and ideally the provision of lugs on the first part of the gripping component, which are received by corresponding indentations in the tubular structure.

In the most preferred embodiment the action of the second set of cams of the locking component further assists in securing the gripping component to the first tubular structure such that it is firm and does not wobble. In the field of microphone technology any vibration is undesirable and should be eliminated as it can impact on the sound quality of the microphone. The use of the second set of cams surfaces prevents movement and wobble of the locking means.

The action of the first set of cam surfaces on the resilient fingers of the second part of the gripping component gives rise to a strong grip on the second tubular structure holding it in the desired position.

The locking means is hollow and generally tubular in nature, which means that the cable of a microphone can be fed down the formed boom pole without any obstruction.

An embodiment of the invention will now be described as an example only and with reference to the drawings in which.

Figure 1:
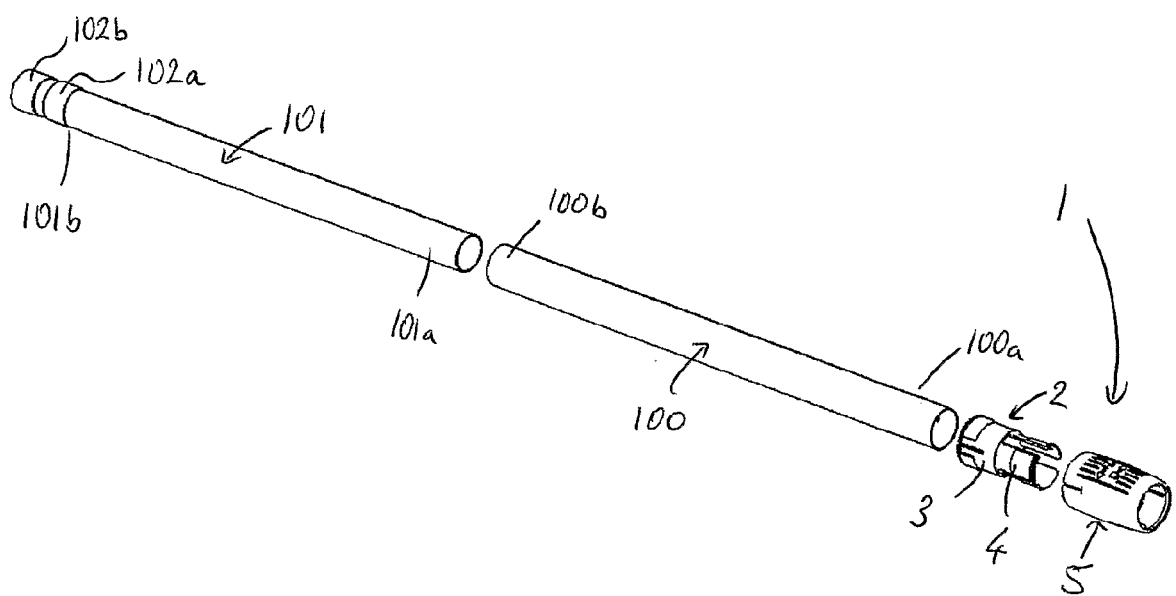
FIG. 1 shows an expanded view of a locking means of the present invention in use with a first and a second tubular structure.

FIG. 1 shows a locking means 1 comprising a gripping component 2, having a first part 3 and a second part 4, and a locking component 5. The locking component 5 is secured to the gripping component 2 such that it is rotatable in relation to the gripping component 2. Also shown in FIG. 1 are a first tubular structure 100 and a second tubular structure 101.

The first tubular structure 100 has a first end 100a and a second end 100b. The first end 100a receives the first part 3 of the gripping component 2. The second end receives the second tubular structure 101.

The second tubular structure 101 has a first end 101a and a second end 101b and is of a suitable diameter to be telescopically received within the first tubular structure 100 and to pass through the second part 4 of the gripping component 2.

The second tubular structure 101 is provided with tapes 102a, 102b around its second end 101b to ensure that the second end is a snug fit inside the first tubular structure 100 and undesirable movement and associated noise is eliminated. The tape 102a closest to the first end 101a of the second tubular structure 101 also acts to prevent the second tubular structure 101 from passing all the way through the first tubular structure 100 as will be explained further in relation to FIG. 3.

Figure 2:
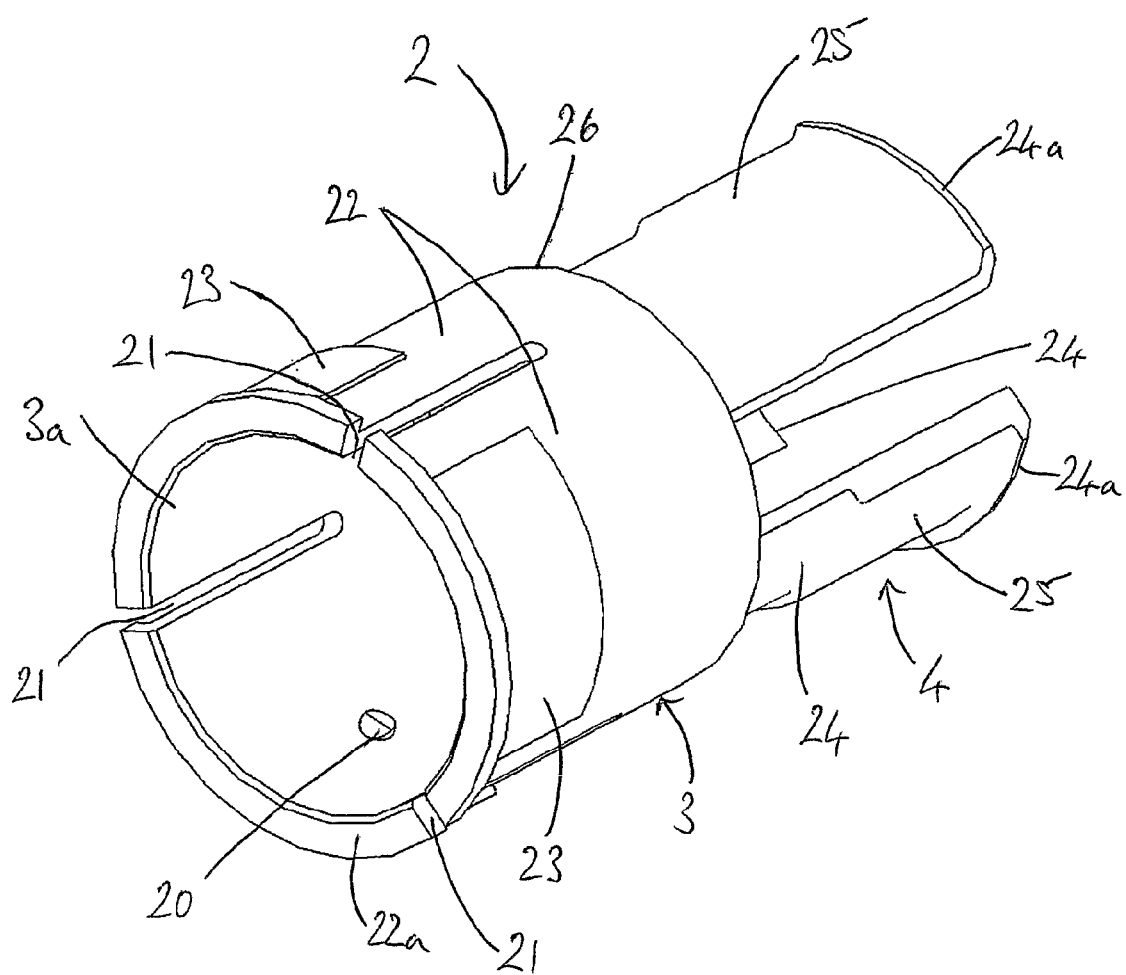
FIG. 2 shows a perspective view of a gripping component of the locking means shown in FIG. 1.

FIG. 2 shows in detail the gripping component 2 of FIG. 1. The gripping component has a first part 3 and a second part 4.

The first part 3 is generally cylindrical in shape and has a first end 3a that is open to receive the first tubular structure 100, shown in FIG. 1. The first part 3 therefore has a first diameter suitable to receive the first tubular structure 100. The inner surface of the first part 3 is provided with a number of protruding lugs 20 which are received in corresponding indentations (not shown in FIG. 2) in the first end 100a of the first tubular structure 100.

The first part 3 has three elongate slots 21 formed along part of its length and extending from the first end 3a to give rise to the formation of three arms 22. Each arm 22 is provided with a raised area forming a cam surface 23 on its outer surface.

There is provided an outwardly extending lip 22a formed on each of the arms 22 to give rise to a rim formed in three parts around the end 3a of the first part 3.

The second part 4 of the gripping component 2 comprises three fingers 24 extending from the first part 3 at its end distal from the first end 3a. The fingers 24 are arranged to form a generally cylindrical structure and are equidistantly spaced apart from each other. There is an inward step 26 in the external profile of the gripping component 2 caused by the diameter of the second part 4 being smaller than that of the first part 2.

The fingers 24 are each provided with raised surface portions forming cam surfaces 25 on their outer surfaces. The fingers 24 are also each provided with outwardly extending lips 24a on their free ends.

The gripping component 2 is generally cylindrical in its overall shape and is therefore hollow. The gripping component 2 is formed from a resilient plastics material. The gripping component is injection moulded from that material.

Figure 3:
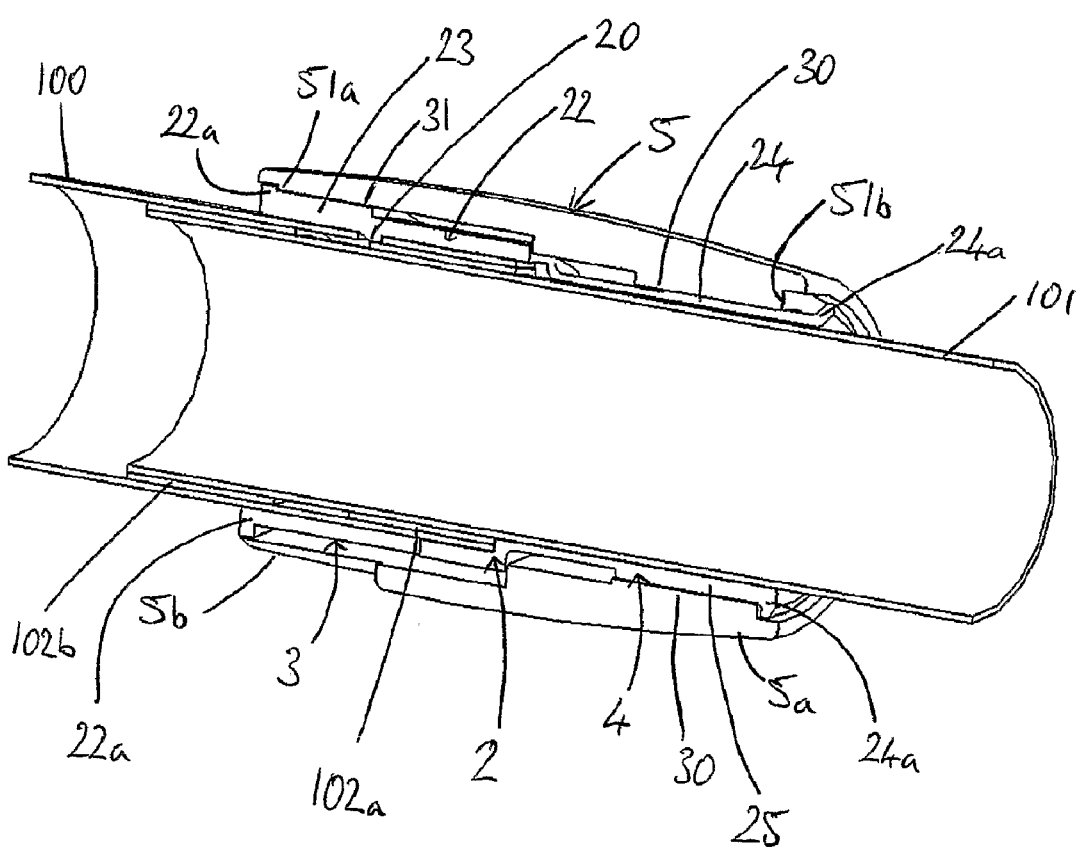
FIG. 3 shows a cross section through a locking means of the present invention in use with a first and a second tubular structure.

FIG. 3 shows the gripping component 2 in use in combination with the locking component 5 to releasably lock the second tubular structure 101 in a predetermined position in relation to the first tubular structure 100.

The locking component 5 is a generally cylindrical collar that is secured in relation to the gripping component by being provided with cut away shoulders 51a, 51b that rest against the lips 22a, 24a of the gripping component respectively. The locking component 5 is rotatable by 10°-90° around the outer surface of the gripping component 2.

The locking component 5 has a first end portion 5a and a second end portion 5b. The first end portion 5a lies adjacent the second end part 4 of the gripping component 2 and the second end portion 5b lies adjacent the first part 3 of the gripping component 2.

The locking component 5 is provided with two sets of cam surfaces extending from its inner surface. The first set of cam surfaces 30 is provided close to the first end 5a of the locking component 5. The cam surfaces 30 are positioned and sized to contact the cam surfaces 25 of the fingers 24 when the locking component 5 is in the locked position. The cam surfaces 30 are also positioned and sized to be in incomplete contact with the cam surfaces 25 of the fingers 24 when the locking component 5 is in the open position. There are therefore three cam surfaces 30 spaced equidistantly around the inner surface of the first end 5a of the locking component 5.

The second set of cam surfaces 31 is provided close to the second end 5b of the locking component 5. The cam surfaces 31 are positioned and sized to contact the cam surfaces 23 of the arms 22 when the locking portion is in the locked position. The cam surfaces 31 are also positioned and sized to be in incomplete contact with the cam surfaces 23 of the arms 22 when the locking component 5 is in the open position The second end portion 5b of the locking component 5 is provided with a number of elongate cut away portions (not shown) extending along its length to allow movement of the locking component between locked and open positions.

The locking component is made from a resilient plastic material and ideally is injection moulded from that material.

In use to assemble the first and second tubular structures and the locking means for the first time the locking means 1 is secured to the first tubular structure 100 by receipt of the first end 100a of the first tubular structure within the first part 3 of the gripping component 2 and engagement of the lugs 20 in apertures provided in the first tubular structure 100.

The locking component 5 is then passed over the gripping component 2, with the second end portion 5b leading and passing firstly over the second end 4 of the gripping component, until the shoulder 51a of the second end portion 5b abuts the lip 22a of the first part 3 and the shoulder 51b of the first end portion 5a rests against the lip 24a of the second part 4. To allow the locking component 5 to pass over the gripping component 2 the fingers 24 of the second end part 4 are squeezed together until the locking component 5 is in position relative to the gripping component 2.

The first end 110a of the second tubular structure 101 is then passed into the second end 100b of the first tubular structure 100 and through the channel defined by fingers 24 of the second part 4 of the gripping component 2. The presence of the second tubular structure 101 in the channel defined by the fingers 24 prevents the fingers 24 of the second part 4 of the gripping component 2 from being squeezed together sufficiently to allow removal of the locking component 5 from its position around the gripping component 2.

Tape 102a provided around the second tubular structure 101, closest to the first end of the second tubular structure 101, acts to prevent the second tubular structure 101 from passing straight through the first tubular structure 100. The tape 102a abuts the stepped portion 26 of the gripping component 2 where the fingers 24 extend from the first part 3 and is suitably sized not to be able to pass through the stepped portion 26 of the gripping component 2.

Once the first and second tubular structures and the locking means have been assembled the second tubular structure can be telescopically moved in relation to the second tubular structure and there is no need to disassemble the structure for storage or transport it can simply be telescopically contracted to a small and manageable size.

To secure the second tubular structure 101 in a predetermined position relative to the first tubular structure 100 the locking component 5 of the locking means 1 is rotated through 10°-90°, preferably 30°-45°, to bring the first set of cam surfaces 30 into position over, and therefore in contact with, the cam surfaces 25 of the fingers 24. This action presses the fingers 24 against the second tubular structure 101 to hold it in position.

The engagement of the first set of cam surfaces 30 with the cam surfaces 25 of the fingers 24 on rotation of the locking component 5 causes the second set of cam surfaces 31 of the locking component 5 to apply pressure to the cam surfaces 23 of the arms 22. The elongate cut away portions in the second end portion 5b of the locking component 5 allow movement of the first end 5a of the locking component 5 to force the second end 5b of the locking component 5 to expand away from its usual position. The resilient material used to form the locking component 5 ensures that the second end 5b tries to regain its original shape and size and therefore the second end 5b exerts pressure on the arms 22 of the first part 3 of the gripping means 2, through the action of the cam surfaces on these parts, which in turn exert pressure on the first tubular structure 100.

This double cam action ensures that the locking means 5 works in relation to both tubular structures 100, 101 thus reducing or eliminating movement and any associated noise and giving a strong joint. Injection moulding of the locking means and the material used makes the manufacture of the locking means cost effective. The way in which the locking means is secured to the first tubular structure makes this action quick and simple.

The invention claimed is:

1. A lock for use in releasably locking a first tubular structure of a first diameter and a second tubular structure of a second diameter in a predetermined position telescopically in relation to each other, wherein the second diameter is less than the first diameter, the lock comprising:
  a gripping component arranged to grip at least the second tubular structure and a locking component arranged such that the lock has a locked position in which the second tubular structure is held in place relative to the first tubular structure and an open position in which the second tubular structure is telescopically movable relative to the first tubular structure,
  wherein the gripping component comprises a first part sized and arranged to receive the first tubular structure and a second part extending from the first part and sized and arranged to receive the second tubular structure wherein the second part comprises a plurality of resilient fingers,
  wherein the locking component extends around at least part of the gripping component,
  wherein the locking component comprises a collar that extends around the gripping component and contacts at least part of an outer surface of the gripping component,
  wherein the collar is provided with a first cam surface set comprising at least one earn surface positioned on an inner surface of the collar such that at least one cam surface of the first cam surface set contacts at least one of the plurality of resilient fingers so as to bring the resilient fingers into contact with the second tubular structure when the collar is in the locked position,
  wherein the first part of the gripping component is provided with a plurality of cut away portions extending parallel to the longitudinal axis of the gripping component, providing the first part with a plurality of resilient arms separated by at least one of the plurality of cut away portions,
  wherein the collar of the locking component is provided with a second cam surface set comprising at least one cam surface positioned on the inner surface of the collar such that at least one of the cam surfaces of the second cam surface set contacts at least one of the plurality of resilient arms when the collar is in the locked position.

2. A lock according to claim 1, in which the collar is provided with at least one cut away portion extending parallel to the longitudinal axis of the collar.

3. A lock according to claim 2, wherein the collar has a first end and a second end, wherein the second cam surface set is provided close to the second end of the collar and the cut away portions of the collar are provided on the second end of the collar.

4. A lock according to claim 1, wherein the second cam surface set engages raised areas positioned on an external surface of the resilient arms when the collar is in the locked position.

5. A lock according to claim 1, wherein the second cam surface set comprises a cam surface positioned to act on each resilient arm.

6. A lock according to claim 1, wherein at least one of the resilient fingers are provided with a raised area being a cam surface on an external surface thereof.

7. A lock according to claim 1, wherein the gripping component is provided with a plurality of lugs extending from an inner surface of the gripping component, the plurality of lugs being locatable in indentations provided in the first tubular structure.

8. A lock according to claim 1, wherein the collar is rotatable relative to a longitudinal axis of the gripping component.

9. An assembly comprising:
  a first tubular structure of a first diameter,
  a second tubular structure of a second diameter where the second diameter is less than the first diameter, and
  a lock for use in releasably locking the first tubular structure and the second tubular structure in a predetermined position telescopically in relation to each other; the lock comprising a gripping component arranged to grip at least the second tubular structure and a locking component arranged such that the lock has a locked position in which the second tubular structure is held in place relative to the first tubular structure and an open position in which the second tubular structure is telescopically movable relative to the first tubular structure,
  wherein the gripping component comprises a first part sized and arranged to receive the first tubular structure and a second part extending from the first part and sized and arranged to receive the second tubular structure wherein the second pan comprises a plurality of resilient fingers,
  wherein the locking component extends around at least part of the gripping component,
  wherein the locking component comprises a collar that extends around the gripping component and contacts at least part of an outer surface of the gripping component,
  wherein the collar is provided with a first cam surface set comprising at least one cam surface positioned on an inner surface of the collar such that at least one cam surface of the first cam surface set contacts at least one of the plurality of resilient fingers so as to bring the resilient fingers into contact with the second tubular structure when the collar is in the locked position,
  wherein the first part of the gripping component is provided with a plurality of cut away portions extending parallel to a longitudinal axis of the gripping component, providing the first part with a plurality of resilient arms separated by the plurality of cut away portions,
  wherein the collar of the locking component is provided with a second cam surface set comprising at least one cam surface positioned on the inner surface of the collar such that at least one cam surface of the second cam surface set contacts at least one of the plurality of resilient arms when the collar is in the locked position.

* * * * *